United States Patent
Brown et al.

(10) Patent No.: US 8,826,008 B2
(45) Date of Patent: Sep. 2, 2014

(54) METHOD AND DEVICE FOR SECURE NOTIFICATION OF IDENTITY

(75) Inventors: Michael Stephen Brown, Kitchener (CA); David Francis Tapuska, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 13/566,252

(22) Filed: Aug. 3, 2012

(65) Prior Publication Data

US 2013/0145153 A1 Jun. 6, 2013

Related U.S. Application Data

(60) Provisional application No. 61/566,410, filed on Dec. 2, 2011.

(51) Int. Cl.
*H04L 9/32* (2006.01)

(52) U.S. Cl.
USPC .......................... 713/156; 713/175; 713/180

(58) Field of Classification Search
None
See application file for complete search history.

(56) References Cited

U.S. PATENT DOCUMENTS

| | | | | |
|---|---|---|---|---|
| 6,763,459 | B1 * | 7/2004 | Corella | 713/156 |
| 7,269,726 | B1 * | 9/2007 | Corella | 713/156 |
| 7,320,073 | B2 * | 1/2008 | Zissimopoulos et al. | 713/179 |
| 7,366,905 | B2 * | 4/2008 | Paatero | 713/175 |
| 7,549,043 | B2 * | 6/2009 | Adams et al. | 713/156 |
| 7,861,077 | B1 * | 12/2010 | Gallagher, III | 713/155 |
| 7,934,006 | B2 * | 4/2011 | Kato et al. | 709/229 |
| 7,991,832 | B2 * | 8/2011 | Hatanaka et al. | 709/203 |
| 8,028,302 | B2 * | 9/2011 | Glotzbach et al. | 719/328 |
| 8,132,013 | B2 * | 3/2012 | Meier | 713/176 |
| 8,266,425 | B2 * | 9/2012 | Fahn et al. | 713/156 |
| 8,295,486 | B2 * | 10/2012 | Bender et al. | 380/270 |
| 8,341,411 | B2 | 12/2012 | Brown et al. | |
| 8,387,132 | B2 * | 2/2013 | Frank et al. | 726/15 |
| 8,621,203 | B2 * | 12/2013 | Ekberg et al. | 713/156 |
| 2002/0178360 | A1 * | 11/2002 | Wenocur et al. | 713/170 |
| 2004/0264443 | A1 * | 12/2004 | Beck et al. | 370/352 |
| 2005/0114666 | A1 * | 5/2005 | Sudia | 713/175 |
| 2006/0059346 | A1 * | 3/2006 | Sherman et al. | 713/175 |
| 2008/0046739 | A1 | 2/2008 | Adams et al. | |

(Continued)

FOREIGN PATENT DOCUMENTS

| | | | | |
|---|---|---|---|---|
| EP | 1349123 | A2 * | 10/2003 | G07F 7/10 |
| WO | 0131836 | A2 | 5/2001 | |

OTHER PUBLICATIONS

How to Retrieve the Thumbprint of a Certificate; Microsoft, 2011; http://msdn.microsoft.com/en-us/library/ms734695(d=printer).aspx.

(Continued)

*Primary Examiner* — Cordelia Zecher
*Assistant Examiner* — Richard McCoy
(74) *Attorney, Agent, or Firm* — Rideout & Maybee LLP (57) ABSTRACT

A system, methods and devices for the secure notification of an identity in a communications network. The methods include sending or receiving a communication including a hash of a certificate of a device to notify or detect the presence of the device in a network. Each certificate is associated with an identity which is excluded from the communication of the hash of the certificate. The received hash is compared to hashes of certificates stored in an electronic device to determine an identity. The identity may represent an electronic device or a user of the electronic device.

16 Claims, 5 Drawing Sheets

(56) References Cited

U.S. PATENT DOCUMENTS

| | | | |
|---|---|---|---|
| 2008/0224823 A1* | 9/2008 | Lawson et al. | 340/5.8 |
| 2010/0031328 A1* | 2/2010 | Hodgkinson | 726/5 |
| 2010/0180329 A1* | 7/2010 | Guski et al. | 726/8 |
| 2010/0184509 A1* | 7/2010 | Sylla et al. | 463/29 |
| 2012/0297195 A1 | 11/2012 | Brown et al. | |

OTHER PUBLICATIONS

How to Install the Root Certificate; ECE Information Technology Services. Jul. 31, 2009; http://help.ece.ubc.ca/How_To_Install_The_Root_Certificate.

Secure Logins; https://bto.bluecoat.com/packetguide/8.3/info/secure-logins.htm.

ITU-T; International Telecommunications Union; Telecommunication Standardization Sector of ITU; X 509; Series X: Data Networks, Open System Communications and Security Directory: Nov. 2008.

ActiveX Reuse Browser Client Certificate: http://stackoverflow.com/questions/6292176/activex-reuse-browser-client-certificate.

Certificate Trust Model; MXC Software; http://www.mxcsoft.com/Cryp_Trust%20Model.htm.

How to Valdate a Certificate Chain: D.I. Management Services Pty Limited; Feb. 21, 2009; http://www.cryptosys.net/pki/x509_validatechain.html.

About the Intel AMT Remote Configuration feature; Mar. 2011; http://www.symantex.com/docs/HOWTO47717.

HP, AMT Setup and Configuration for the Z200 Workstation with Intel AMT Technology; Mar. 2010.

Intel AMT Enhancements for Remote Configuration; http://software.intel.com/sites/manageability/AMT_Implementation_and_Reference_Guide/DOCS/Implementation%20and%20Reference%20Guide/default.htm?turl=WordDocuments%2Fintelamtconfigurationsecuritymodels.htm.

Schneier B Ed, "Applied cryptography One-Way Hash Functions", Applied Cryptography Protocols, Algorithms, and Source Code in C, Jan. 1, 1996, pp. 30-31, XP002961563, John Wiley & Sons, New York, NY, USA.

Schneier Bruce Ed, "Applied cryptography, Authentication", Applied Cryptography: Protocols, Algorithms, and Source Code in C, Jan. 1, 1996, pp. 52-53, XP002619016, John Wiley & Sons, New York, NY, USA.

* cited by examiner

METHOD AND DEVICE FOR SECURE NOTIFICATION OF IDENTITY

CROSS REFERENCE TO RELATED APPLICATIONS

This application claims the benefit of U.S. Application No. 61/566,410 filed Dec. 2, 2011, the contents of which are herein incorporated by reference.

TECHNICAL FIELD

Example embodiments relate to the fields of notification of presence in a communications network, security and authentication and more specifically to the secure communication of an identity.

BACKGROUND

Some conventional communications systems involve a process of communication of an identity in a communications network. The identity may be a serial number, account name or user name associated with an electronic device or associated with a user of an electronic device. The process of communicating an identity using current protocols is unsecure. Thus, other devices can eavesdrop and monitor traffic on a computer network and determine the identities of users or devices or users and devices present in the network. It may be difficult to establish a link or communications between devices or between users of devices without other users and devices being able to monitor or receive the identity.

BRIEF DESCRIPTION OF THE DRAWINGS

Embodiments will now be described, by way of example only, with reference to the attached Figures, wherein.

Like reference numerals are used throughout the Figures to denote similar elements and features.

DETAILED DESCRIPTION OF EXAMPLE EMBODIMENTS

According to an embodiment of the present disclosure, there is provided a method of secure notification of presence of an electronic device in a communications network, the method comprising: obtaining a certificate associated with an identity in an electronic device; generating a hash of the certificate; and sending a communication including the hash of the certificate to a communications network, the communication excluding information regarding the identity.

According to another embodiment of the present disclosure there is provided an electronic device, comprising: a communication subsystem for sending and receiving communications over a network; a memory storing a certificate associated with an identity; and a processor configured to: obtain the certificate, generate a hash of the certificate; and send a communication including the hash of the certificate to the communications network, the communication excluding information regarding the identity.

According to another embodiment of the present disclosure there is provided a method of secure identification of a sending electronic device using a receiving electronic device, the method comprising: storing one or more certificates in a memory of a receiving electronic device, each of the certificates associated with an identity; receiving a communication from a communications network, the communication including a received hash of a certificate of a sending device, the communication excluding information regarding the identity; comparing the received hash with hashes of the one or more stored certificates; and on a condition that the received hash corresponds to one of the hashes of the stored certificates; identifying the identity of the sending device as the identity associated with the received hash.

According to another embodiment of the present disclosure there is provided an electronic device, comprising: a communication subsystem for sending and receiving communications over a network; a memory storing a plurality of certificates, each certificate associated with an identity; and a processor configured to: receive a communication from the network, the communication including a received hash of a certificate of a sending device and excluding information regarding an identity of the sending device, compare the received hash with hashes of the plurality of store certificates; and on a condition that the received hash corresponds to one of the hashes of the stored certificates, identify the identity of the sending device as the identity associated with the received hash.

According to another embodiment of the present disclosure there is provided a system for secure communications, the system comprising: a communications network; a sending electronic device configured to: obtain a certificate associated with an identity of the sending electronic device; and send a communication including a hash of the certificate to the communications network, the communication excluding information regarding the identity; a receiving electronic device configured to: store a plurality of certificates associated with one or more identities in a memory of the receiving device, receive the communication including the hash from the sending device, compare the received hash with hashes of the plurality of stored certificates, and on a condition that the received hash corresponds to one of the hashes of the stored certificates, identify the identity of the sending device as the identity associated with the received hash.

In one embodiment, the system comprises a server configured to store a plurality of certificates and associated identities and to communicate with sending and receiving electronic devices. In one embodiment, the server is configured to respond to queries based on identity. In one embodiment, the sending electronic device is configured to send a multicast message containing an address location identifying where to retrieve the hash; the receiving device is configured to send a request for the hash at the address location in response to receiving the multicast message; and the sending device is configured to send the hash of the certificate of the sending device in response to the request from the receiving device. In one embodiment, the multicast message comprises an SSDP NOTIFY message, the address location comprises a URL address of a location of the hash certificate of the sending device and wherein the request comprises an HTTP GET request of URL address. In another embodiment, the receiving electronic device is configured to obtain a certificate and associate the certificate with an identity of the receiving electronic device; and the identity of the sending electronic device and the identity of the receiving electronic device are associated with a user identity.

The present disclosure generally relates to a system for the secure notification of an identity of an electronic device 110 in a communications network 101 as well as methods and devices for sending transmissions to advertise the presence of an electronic device 110 in the communications network 101 and for receiving such transmissions from an electronic device 110. The identity may be associated with an electronic device 110 or with a user of the electronic device 110. The identities of peer devices 110 or of peer users of devices 110 may be stored in a memory of the electronic device 110 to permit the device 110 to identify notifications from its known peers.

For example purposes, the electronic devices 110 may be described herein as a sending device 110 which sends one or more transmissions to communicate the presence of the electronic device 110 in the network 101 and as a receiving device 110 which receives transmissions and communications regarding the presence of other electronic devices 110 in the network 101. It will be appreciated that each of the sending device and receiving device may be configured to send, receive or send and receive communications according to the embodiments described herein.

Figure 1:
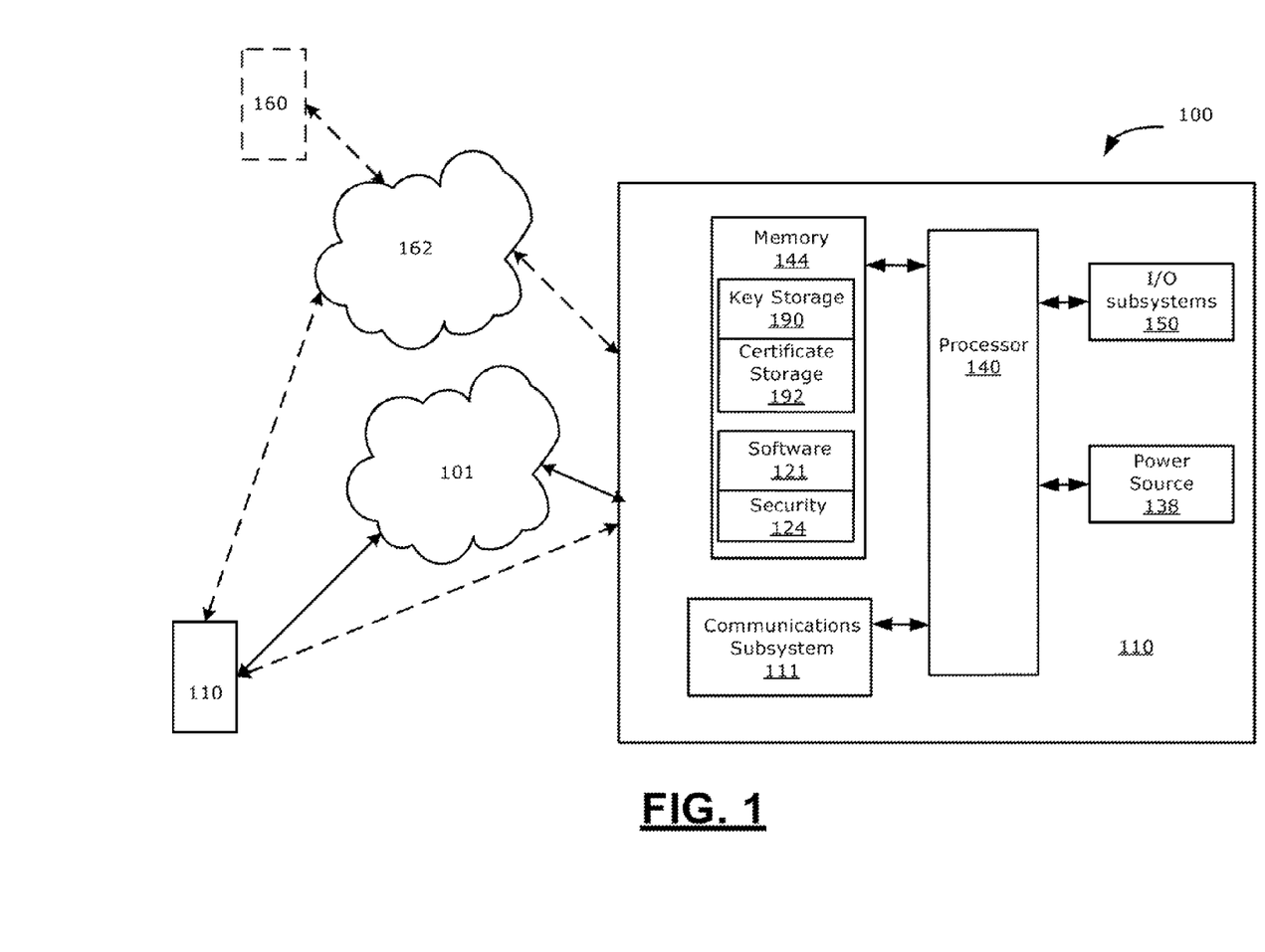
FIG. 1 is a block diagram illustrating a system and an electronic device in accordance with one implementation of the present disclosure.

FIG. 1 illustrates a system 100 including a communications network 101 and electronic devices 110 in which example embodiments described in the present disclosure can be applied. The system 100 supports communications between two or more electronic devices 110 through the communications network 101. Communications may comprise messages sent between electronic devices 110 or between users of the electronic devices 110. The communications network 101 may be a wired network, a wireless network or a combination of wired and wireless networks. In some embodiments, the system 100 includes a second communications network 162 which may be a wired network, a wireless network, or a combination of wired and wireless networks. The second communications network 162 may provide secure communications such as with AES or DES/Triple DES encryption or schemes based on public key cryptography. In some embodiments, communications may occur directly between the electronic devices 110 such as through a Bluetooth™ connection.

In example embodiments, the electronic device is a portable electronic device 110. It will be understood that the present application is not limited to portable electronic devices and may be implemented using non-portable electronic devices, such as personal or desktop computers. Examples of portable electronic devices 110 include mobile, or handheld, wireless electronic devices such as pagers, cellular phones, cellular smart-phones, wireless organizers, personal digital assistants, wirelessly enabled notebook computers, and so forth. The portable electronic device 110 may also be a portable electronic device 110 without wired communication capabilities, such as a handheld electronic game device, laptop, or other device.

In an example embodiment, the system 100 supports encrypted communications and the electronic device 110 may implement asymmetric keys which include related public key/private key pairs, wherein a key pair can be associated with a specified identity of a user or of a device. The electronic device 110 may be configured to implement signing or verification or also encryption/decryption using the associated keys.

For some applications, a private key may be used by a sender to sign outgoing data and/or to decrypt incoming data. A corresponding public key may be used by a recipient to verify a signature, that is, verify if the sender signed the data using the private key. In some cases, a public key is used to encrypt outgoing data. A public key certificate includes the public key as well as the identity information of a device or of a user of a device. Such a public key certificate may be referred to as an identity key certificate, or merely a certificate.

Various examples of verification and authentication processes are described in the ITU-T X.509 standard, version 11/2008, the contents of which are herein incorporated by reference. In an example implementation, to sign data, the sender creates a hash of the data, and then signs the hash with the private key. The sender then sends the signed hash along with the data and the certificate. The recipient, after receipt of these items, can recreate the hash of the data, verify the signed hash using the public key and finally verify the certificate. A certificate in accordance with the X.509 standard may sometimes be referred to as an X.509 certificate.

An electronic device 110 in which example embodiments described in the present disclosure can be applied also is illustrated in FIG. 1. Depending on the functionality provided by the electronic device 110, in various embodiments, the device may be a multiple-mode communications device configured for both data and voice communication. The communications subsystem 111 provides for communications between the electronic device 110 and different systems or devices, which need not necessarily be similar devices.

The electronic device 110 includes a controller 140 such as a microprocessor, which controls the overall operation of the electronic device 110. The controller 140 interacts with other device components such as memory 144, system software 121 stored in memory 144, input/output subsystems 150 and the communications subsystem 111. A power source 138, such as one or more rechargeable batteries or a port to an external power supply, powers the electronic device 110.

For illustration purposes, FIG. 1 shows a security module 124 as a component of the system software 121. In some example embodiments, the security module 124 may perform security functions including the generation and management of private keys and/or public keys. The security module 124 may be used to perform the encryption/decryption or the signing/verification of data using such keys, as described in detail herein.

In some example embodiments, the electronic device 110 is configured to implement encryption or verification using the associated keys. For example, the electronic device 110 may store within a key storage 190 in memory 144 one or more public keys, one or more private keys, or a combination of public keys and private keys. In some embodiments, the electronic device 110 is configured or operates as a web client and/or as a server. When implementing or operating as the web server for signing, the electronic device 110 can store and use a private key to sign outgoing data. A corresponding public key may be used by a recipient or client to verify that the electronic device 110 signed the data using the private key.

The key storage 190 may include any portion of memory 144 on the device 110. In some embodiments, the memory 144 may include a secure area in which sensitive data, such as key and certificate material, is stored. In some embodiments, the secure area may itself be secured using cryptography to prevent unauthorized access.

In some example embodiments, the security module 124 may be used to create or store a key pair. The public key certificate may be a root certificate or a self-signed certificate (hereinafter root certificate for convenience). In such an instance, the electronic device 110 may be referred to as a certificate authority (CA). The root certificate of a CA can be used to verify other public certificates, for example in a chain of trust implementation. In some example embodiments, the security module 124 may be used to receive and store a certificate for the device 110 generated by another entity such as a certificate authority.

An example application of a certificate is to secure a session or Internet session between parties, for example using transport layer security (TLS)/secure sockets layer (SSL) to implement hypertext transfer protocol secure (HTTPS). Example applications include web browsing, electronic mail, Internet faxing, instant messaging, voice-over-IP (VoIP), virtual private networks (VPN) and peer-to-peer communications.

In example embodiments, a thumbprint, fingerprint or certificate hash represents the binary data (e.g. hexadecimal representation) produced by using a hashing algorithm on a certificate. Although the thumbprint uniquely identifies a certificate, the thumbprint cannot be used to re-create a certificate as hashing is a one-way process.

Some example embodiments may be applied to a chain of trust environment. In a chain of trust, certificates are issued and signed by certificate authorities that reside higher in the certificate hierarchy, so that the validity and trustworthiness of a given certificate is determined by the corresponding validity of the certificate associated with the certificate authority that signed the given certificate. Thus, there is often a root CA, which provides the ultimate in attestation authority in that chain of trust scheme. Accordingly, the root CA may be the trust anchor for the digital certificate.

Some example embodiments may be applied to a web of trust environment wherein there is no central CA, and accordingly identity certificates for some or all of the clients may be self-signed. In this case, the additional signatures from some or all of the other clients are evaluated to determine whether a certificate should be accepted as correct. Each generated root certificate may be communicated between devices. For example, at least the root certificate from the electronic device 110 may be communicated to at least another client in the web of trust accordance with the described example embodiments. At least some of the remaining clients may similarly implement the described example embodiments.

The electronic device 110 may store within a certificate storage 192 in the memory 144 a certificate of the device 110 as well as one or more certificates of other devices 110. The certificates may comprise self-signed certificates of the devices 110, or certificates generated by another entity, or a combination of self-signed certificates and certificates generated by another entity. In one embodiment, the certificates comprise certificates generated by a certificate authority (CA) for each device 110. Each certificate is associated with an identity which represents the device 110 or which represents a user of the device 110. In some embodiments, the identity may be included as part of the information in the certificate. Alternatively, or additionally, the certificates may be stored within certificate storage area 192 along with an identity which represents the device 110 or which represents a user of the device 110.

The system 100 and electronic device 110 support a discovery protocol to enable electronic devices 110 to send communications to advertise the presence of the electronic device 110 in the communications network 101 and to receive communications regarding the presence of other electronic devices 110 in the network 101. Such communications also may include an address, such as a HTTP URL for a location storing an XML description of the device 110 and services available from the device 110. Descriptions of the device 110 and services available from the device 110 may be stored in the memory 144 of the device 110. Communications also may be sent in response to requests for information and to notify other devices of the withdrawal of the electronic device 110 from the network 101. The discovery protocol may comprise a simple service discovery protocol (SSDP), a universal plug and play (UPNP) system, a DLNA™ (Digital Living Network Alliance) service discovery and control protocol, multicast DNS (Domain Name System)/DNS-SD (Service Discovery), a proprietary discovery or zero configuration networking protocol or other similar protocols.

The system 100 includes a sending electronic device 110 which is configured to send a secure notification of the presence of the device 110 in the network 101. The electronic device 110 is configured to send transmissions including a hash of a certificate of the electronic device 110. The certificate is associated with an identity which represents the sending device 110 or a user of the sending device 110. The hash is received by a receiving electronic device 110 which has stored in the memory 144 of the receiving electronic device 110 a plurality of certificates. The plurality of certificates and associated identities may represent peer or known devices 110 or users in the network 101. The receiving device compares the received hash with hashes of the plurality of certificates stored in the memory 144 of the receiving device 110. If the received hash corresponds to a hash of one of the plurality of certificates stored in the electronic device, the identity associated with the certificate for the corresponding hash is used to identify the originator of the transmission as one of the peers or identities known to the device 110. The identity, which may represent the identity of the sending device 110 or the identity of a user of sending device 110, and presence of the identity in the communications network 101 is thus determined by the receiving device 110 in a secure manner.

Figure 2:
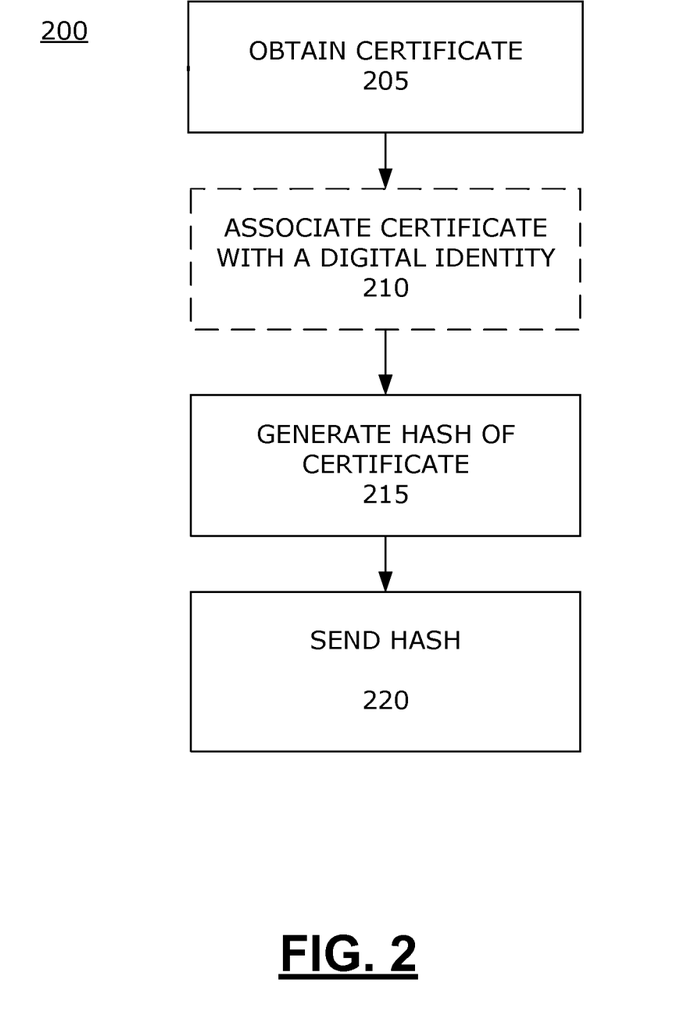
FIG. 2 shows, in flowchart form, an example method in accordance with implementations of the present disclosure.

A method 200 of secure notification of the presence of a device 110 in the communications network 101 is illustrated in FIG. 2 and is described in further detail below. An electronic device 110 obtains 205 a certificate which is associated with an identity and which is stored in the certificate storage 192 of the memory 144. In some embodiments, the certificate includes the identity. In some embodiments, the method 200 includes associating the certificate 210 with the identity. A hash of the certificate is generated 215 and also may be stored in the certificate storage 192. The hash of the certificate of the sending device 110 is sent 220 to the communications network 101. The hash of the certificate may be sent as a broadcast or multicast message or it may be sent in response to a request to the sending device 110. The hash of the certificate is transmitted instead of transmitting an identity or an identifier of the electronic device 110 such as a device serial number. Thus, if the transmission is monitored by other devices or intercepted, the identity is not likely to be compromised.

At 205, the sending electronic device 110 obtains a certificate. In some embodiments, the certificate is obtained by the device 110 by the security module 124 generating a self-signed certificate or root certificate. In some embodiments, the certificate is obtained by the device 110 from another device or entity such as a CA. The certificate is generated by the CA and may be transmitted to the device 110 or downloaded by or to the device 100 over a communications network 101 or a communications network 162. In some embodiments, the certificate from the CA may be configured in the device 110. In some embodiments, the certificate is generated in accordance with the X.509 standard. The certificate is stored in the memory 144 of the electronic device 110 such as in the certificate storage 192.

In some embodiments, the information in the certificate includes an associated identity. In some embodiments, the certificate is associated 210 with or linked to an identity. The identity comprises information identifying the device 110, or information identifying a user of the device 110, or information identifying both the device 110 and a user of the device 110. The identity may comprise a serial number of the device, an account number, an identification number or user name. In one embodiment, the identity comprises a BlackBerry ID (BBID). The identity in turn may be associated with a user of the device 110. The identity can include a common name and a network identifier such as a MAC address or IP address. The common name can include personal information desired to remain secure or private, such as a name, email address, employer corporation and the like. In one example embodiment, the certificate is associated with one identity representing a user of the device 110. It will be appreciated that an identity, such as an identity representing a user, may be associated with more than one certificate and more than one device 110. In one example embodiment, the identity is associated with a first device 110 of a user such as a mobile phone or smart phone, and also with a second device 110 of the user, such as a tablet computer. The certificate includes or is associated 210 with an identity in order to permit a receiving device to determine the identity associated with a hash of the certificate as described below.

The certificates and associated identities may be received from and provided to the devices 110 in a number of ways. In one embodiment, a directory server 160 is configured to store certificates and associated identities and to provide a directory service for identities. The directory service may receive a query from an electronic device 110 requesting the certificates associated with one or more identities. The certificates and associated identities provided by the directory service may be stored in the electronic device 110, such as in the certificate storage 192. As described above, the identity may be included in the information in the certificate or the identity may comprise information separate from and associated with or linked to the certificate. In one embodiment, a peer group may be defined comprising a number of identities which may receive the certificates of other identities in the peer group. The identities may be representative of peers or a known group of users of the devices 110. The directory service may be configured to accept and respond to queries based on permissions associated with the electronic device 110, or a user of the electronic device 110 or an identity, for example, to restrict requests for identities to members of a peer group. An electronic device 110 or a user of an electronic device 110 may belong to more than one peer group, such as a group of coworkers, organization members or friends.

The directory service may be maintained by the directory server 160 in the communications network 101 and may be accessed through a secure communication channel in the network 101. In some embodiments, where the communications network 101 does not support secure communications, the directory server 160 may be accessed through a separate, secure communications network 162 as illustrated in FIG. 1. In one embodiment, an electronic device 110 is configured to store certificates and associated identities and to provide a directory service for identities.

The certificates of one or more electronic devices 110 may be associated with identities and entered and stored in the electronic device 110 through other methods. The certificates and associated identities may be stored in the device 110 during a configuration of the device 110. Alternatively, two users of two electronic devices 110, or one user of two electronic devices may exchange respective certificates and associated identities through a direct secure communication link between the two devices or through communication channels separate from the devices 110, such as secure communications channels. Respective certificates and associated identities of two electronic devices may be exchanged through a secure communications network 162 separate from communications network 101.

A hash of the certificate of the sending device is generated 215. The hash may be generated using known algorithms such as secure hash algorithm (SHA1) or other message digest (MD) algorithms. The hash of the certificate of the sending device 110 may be stored in the certificate storage 192 of the sending device. In one embodiment, the sending and receiving devices 110 and the system 100 are configured to employ the same algorithm for generating hashes of certificates. In one embodiment, the hash algorithm is included in a communication from the sending device 110.

In one embodiment, the sending device 110 identifies itself and advertises or notifies other devices 110 of its presence in the network 101 by sending a message 220 including the hash of the certificate of the sending device 110. In some embodiments, the message comprises a broadcast or multicast message including the hash of the certificate of the sending device 110. In some embodiments, a non-secure communication channel initially may be established over the communications network 101 for communication of the hash.

In another embodiment, the sending device 110 identifies itself and advertises its presence by sending multiple transmissions. A first transmission comprises a broadcast or multicast message which includes one or more device parameters of the sending device 110. The device parameters provide information regarding services available from the device 110 but do not include information regarding an identity of the device 110 or of a user of the device 110. In one embodiment, the device parameters include an address which identifies a location of the sending device 110 where device information regarding the sending device 110 is stored and may be obtained. Such device information includes the hash of the certificate of the sending device 110 as well as information including but not limited to descriptions of services available from the sending device 110 and other functions, identifiers or parameters. In response to the first transmission, a receiving device 110 may submit a request based on the device parameters, such as a request for the information stored at an address location for the sending device. The sending device sends a second transmission which comprises a message to the receiving device 110 including the hash of the certificate of the sending device 110. In one embodiment, the message of the first or second transmission includes an identification of the algorithm used to create the hash of the certificate of the sending device 110.

With the communication of a hash of the certificate of the sending device 110, the identity associated with the certificate and therefore an identity associated with the sending device 110 may be determined by receiving devices 110 as described below. In example embodiments, in response to receiving the device information and hash which may be used by the receiving device 110 to identify the sending device 110, the receiving device 110 may initiate further secure communications with the sending device 110.

In the examples provided above, a client or receiving device 110 may subsequently request an HTTPS connection with the server or sending device 110 in order to validate the identity of the sending device 110. In the event that another electronic device, for reference a "spoofing device", has attempted to use the identity associated with the sending device 110, by using and sending the hash of the sending device 110 as hash of the spoofing device, the attempted HTTPS connection would fail since the spoofing device does not have the key used for the certificate of the sending device 110.

Figure 3:
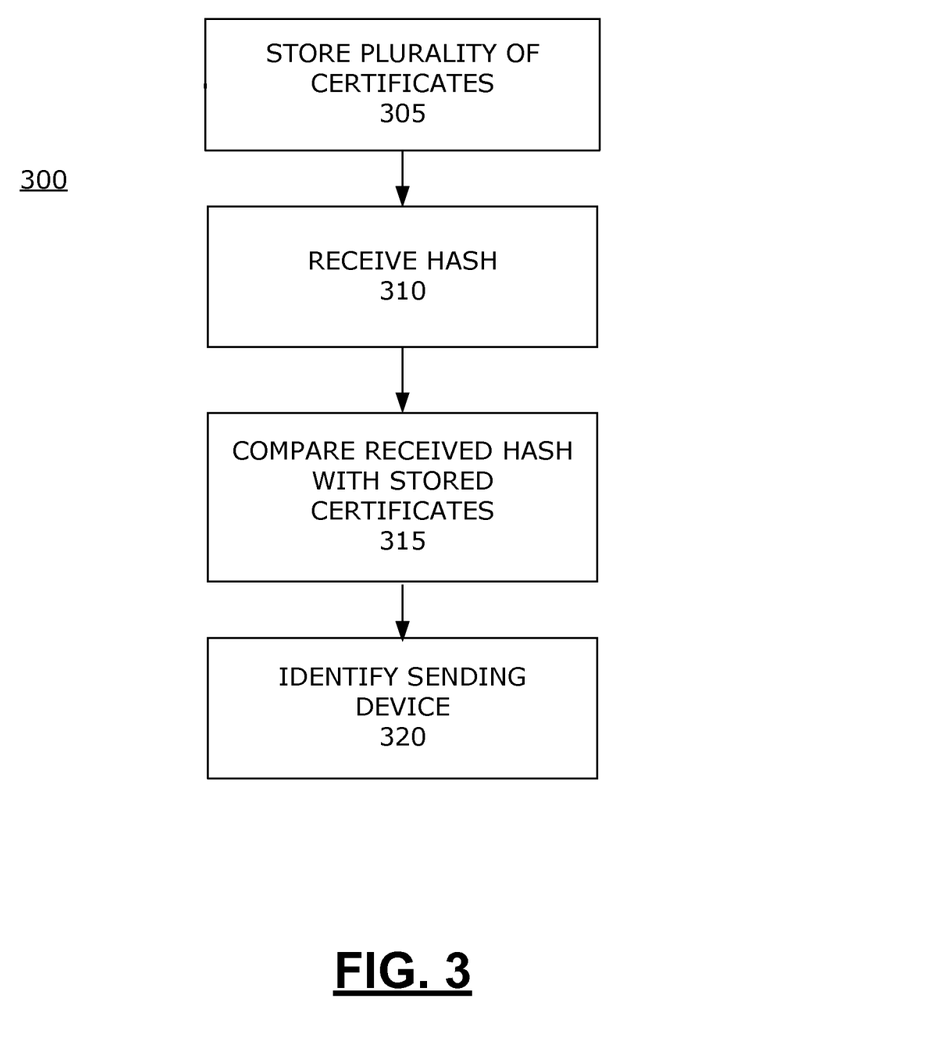
FIG. 3 shows, in flowchart form, an example method in accordance with implementations of the present disclosure.

A method 300 of secure identification of the presence of a device 110 in the communications network 101 is illustrated in FIG. 3 and is described in further detail below. A receiving electronic device 110 stores or pre-stores 305 a plurality of certificates in a memory of the device 110, such as in the certificate storage 192. Each of the plurality of certificates is associated with an identity of a device 110 or of a user of a device 110 in the network 101. In some embodiments, the certificates include the associated identity information. A message is received 310 from the communications network 101 which includes a hash of a certificate of a sending device 110. The received hash is compared 315 with hashes of the certificates stored in the certificate storage 192 of the receiving device 110. If a match is found between the received hash and the hashes of certificates stored in the receiving device 110, the identity associated with the corresponding or matching hash is linked 320 to the sending device 110. A receiving device 110 configured with the certificates and identities of one or more devices 110 in a network 101 may identify the presence of a sending device 110 in the network 101. Other devices, not configured with the certificates and identities, are unable to identify the presence of the sending device 110 and the identity in the network 101.

In the method 300, a number of certificates of devices 110 and associated identities are stored 305 in the receiving device 110. The certificates and associated identities may be stored in the certificate storage 192 which may comprise a secure area of memory. In one embodiment, the certificates and associated identities are stored in the receiving device 110 during a configuration of the device 110. In another embodiment, the receiving device is configured to send a query to a directory service provided by a directory server 160 to request and receive copies certificates and associated identities. As described above, the identities may be representative of peers or a known group of users of the devices 110. Alternatively, two users of two electronic devices 110, or one user of two electronic devices may exchange respective certificates and associated identities through a direct or indirect secure communication link between the two devices. Respective certificates and associated identities of two electronic devices may be exchanged through a secure communications channel in network 101 or through a secure communications network 162 separate from communications network 101. In some embodiments, hashes of the stored certificates are generated using a predetermined algorithm such as secure hash algorithm (SHA1) or other message digest (MD) algorithms. The generated hashes may also be stored in the certificate storage 192 in association with the certificates and identities. In other embodiments, hashes of the stored certificates are generated each time a comparison with a received hash is performed.

The receiving device 110 receives communications 310 from the network 101 which include messages announcing the presence of other devices, such as a sending device 110, in the network 101. In one embodiment, the received communication comprises a message which includes a hash of the certificate of the sending device 110. In another embodiment, multiple communications occur and the first received communication comprises a broadcast or multicast message which includes one or more device parameters of the sending device 110. The device parameters provide information regarding services available from the device 110 but do not include information regarding an identity of the device 110 or of a user of the device 110. In one embodiment, the device parameters include an address which identifies a location of the sending device 110 where device information regarding the sending device 110 is stored and may be obtained. Such device information includes the hash of the certificate of the sending device 110 as well as information including but not limited to descriptions of services available from the sending device 110 and other functions, identifiers or parameters.

In response to the first received communication, a receiving device 110 may submit a request based on the device parameters to the sending device 110. For example, a receiving device may submit a request for device information stored at an address location provided in the first received communication. A second communication is received which comprises a message to the receiving device 110 including the hash of the certificate of the sending device 110, the hash of the certificate of the sending device being stored at the address location. In one embodiment, the message of the first or second received communication includes an identification of the algorithm used to create the hash of the certificate of the sending device 110.

The hash received from the sending device 110 is compared 315 with hashes which are generated for the certificates stored in the receiving device 110. In one embodiment, hashes are generated for the certificates stored in the receiving device 110 using the hash algorithm sent by the sending device 110. In some embodiments, the hash received from the sending device 110 is compared 315 with hashes of the stored certificates which have been generated and stored along with the certificates and identities in the certificate storage 192.

If a match is found between the received hash and a hash of a certificate stored in the receiving device 110, the identity associated with the stored certificate is used to identify 320 the sending device 110 as one of the peers or identities known to the receiving device 110. Accordingly, some example embodiments may provide a secure reverse lookup of identities stored in the receiving device 110 based on the received hash, as the received hash does not itself include such device information of a user or of a device. In response to finding a match between the received hash and a hash of a certificate stored in the receiving device 110, the receiving device 110 may take further action such as initiating secure communications with the sending device 110. In one embodiment, the receiving device 110 may generate a notification to a user, such as generating and displaying a message through I/O subsystems 150 to alert or inform a user of a receiving device 110 of the identities of other devices 110 or of other users of devices in the network 101. The notification of the presence of the sending device 110 is secure since other devices in the communications network 101 which do not have the certificate and associated identity stored in memory are not able to determine the identity associated with the sending device 110 based only on the received hash. Such other devices may still communicate with the sending device 110 which would be identified only by the hash of the certificate.

If no match is found between a received hash and a hash of a certificate stored in the receiving device 110, an identity of the sending device 110 or of a user of a sending device 110 may be unknown. In one embodiment, the receiving device 110 is configured only to initiate further communications with a sending device 110 where the identity is known. In other embodiments, additional authentication, identification or security measures may be employed to support communications between the receiving device and the unknown sending device 110. In one embodiment, the receiving device 110 may initiate communications with the sending device 110 regardless of the known or unknown identity of the sending device 110.

In some embodiments, the receiving device 110 stores information to track the presence and identities of devices 110 in the network 101 including information regarding the services available from the devices 110. The receiving device 110 may store other device parameters in association with the identity of the tracked devices, such as a unique service name. In one embodiment, if a sending device 110 is no longer available, operational or present in the network 101, a communication may be sent to notify other devices 110 in the network 101 that the sending device 110 is leaving the network 101. In one embodiment, a broadcast or multicast message or multiple messages may be sent, as described above, to provide the identification of the sending device 110 that is leaving the network 101. In another embodiment, a broadcast or multicast message with an alternative device parameter such as a unique service name may be sent to notify receiving devices 110 of the departure of the sending device 110. In another embodiment, information stored to track a sending device 110 in the network 101 may be deleted after a predetermined time period has expired and, for example, additional communications or notifications from the sending device 110 have not been received.

In some example embodiments of the methods, devices 110 and system 100, the sending device 110 generates a salted hash of the certificate of the sending device. A salted hash is generated by applying a hash function to a combination of the certificate of the sending device 110 and a salt (e.g. bytes of random numbers). The salted hash and the salt may be sent by the sending device 110 in a broadcast or multicast message or provided with the device information. The receiving device 110 similarly generates salted hashes of the certificates stored in the certificate storage 192 in order to compare and determine whether there is a match with the received salted hash. The use of a salted hash changes the data which is transmitted as the hash of the certificate and prevents other devices from monitoring and gathering information about devices 110 in the communications network 101 based on repeated transmissions of the hash of a certificate.

In some example embodiments, the receiving devices 110 store in a certificate storage 192 copies of one or more identities of peer or known devices 110 and certificates of the peer or known devices 110, such as identities and certificates configured in the receiving devices 110 or obtained from a directory server 160 as described above. In some embodiments, the information in the certificate for a device 110 includes the identity. The sending device 110 obtains a certificate associated with an identity, the identity being associated with the sending device 110 or with a user of the sending device 110. The sending device 110 generates a salted hash of the identity and sends a communication including the salted hash of the identity and the salt to the communications network 101. The receiving device 110 receives the communication including the salted hash from the communications network 101. The receiving device 110 compares the received salted hash with salted hashes of the identities stored in the certificate storage 192 of the receiving device 110 generated using the received salt and the hash algorithm. If the received salted hash corresponds to a salted hash of one of the stored identities, the sending device 110 is identified based the matching stored identity. In some embodiments, the receiving device 110 may subsequently request a secure connection with sending device 110 in order to validate the identity of the sending device 110. In the event that another electronic device, for reference a "spoofing device", has attempted to use the identity of sending device 110, by using and sending the hash of the identity of the sending device 110 as the hash of the identity of the spoofing device, the attempted secure connection would fail since the spoofing device does not have the key used for the certificate of the sending device 110.

In example embodiments, the sending device 110 identifies itself and advertises its presence by sending multiple transmissions in accordance with a discovery protocol such as SSDP. In some embodiments, the sending device 110 comprises a web or HTTP server and the receiving device 110 comprises a web or HTTP client. Examples of messages sent by example embodiments of a sending device 110 and a receiving device 110 according to the present disclosure are provided below.

The sending device 110 sends a first transmission comprising a broadcast or multicast message to notify other devices 110 of the presence of the sending device 110 in the communications network. The first transmission may be formatted as an SSDP NOTIFY message. The message includes device parameters such as a unique service name (USN) and LOCATION parameter with an address consisting of a URL address where device information for the sending device 110 is stored and may be obtained. The address may be an address of the sending device 110 or to an external server or other electronic device which may temporarily or permanently store the device information. In some embodiments, the sending device 110 sends the first transmission or NOTIFY message on a periodic basis.

```
NOTIFY * HTTP/1.1
HOST: 239.255.255.250:1900
NT: uuid:d8a8568a-53f7-f623-29e6-147411119657
NTS: ssdp:alive
USN: uuid:d8a8568a-53f7-f623-29e6-147411119657
CACHE-CONTROL: max-age=1800
LOCATION: http://192.168.0.103:5600/d8a8568a-53f7-f623-29e6-
147411119657/description.xml
SERVER: RIM/0.9, UPnP/1.0, RIM /1.0
```

Upon receipt of the message above, the receiving device 110 may send a request based on the device parameters and specifically a request for the device information which is provided at the address indicated by the LOCATION parameter. An example request by a receiving device 110 consisting of an SSDP GET message is provided below.

```
GET /d8a8568a-53f7-f623-29e6-147411119657/description.xml
HTTP/1.1
Accept: text/xml, application/xml
User-Agent: Mozilla/4.0 (compatible; UPnP/1.0; Windows NT/5.1)
Host: 192.168.0.103:5600
Connection: Keep-Alive
Cache-Control: no-cache
Pragma: no-cache
```

In response to the request from the receiving device 110, the sending device 110 sends a second transmission which comprises a message to the receiving device 110 with the device information at the address specified in the LOCATION field. An example response is provided below.

```
HTTP/1.1 200 OK
Accept-Ranges: bytes
Cache-Control: no-cache
Content-Type: text/xml; charset="utf-8"
Date: Thu, 06 Oct 2011 18:58:24 GMT
``` xmlns="urn:schemas-
upnp-org:device-1-
0"><specVersion><major>1</major><minor>0</minor></
specVers
ion><device><deviceType>urn:schemas-upnp-
org:device:BlackBerryDevice:1</
deviceType><friendlyName>My
BlackBerry</friendlyName><manufacturer>RIM</manu-
facturer><
manufacturerURL>http://www.rim.com/</
manufacturerURL><model
Description/><modelName>9800</
modelName><modelNumber>9800
</modelNumber><modelURL>http://www.rim.com/</
modelURL>
<serialNum-
ber>20202020202020202020202020202020202020</
serialNumber><UPC>1234</UPC><UDN>uuid:d8a8568a-
53f7-f623-
29e6-
147411119657</UDN><presentationURL>http://
192.168.0.103/
certificate/</
presentationURL><serviceList><service><serviceType>urn:
schemas-upnp-
org:service:BridgeApplications:1</
serviceType><serviceId>urn:upnp
-
org:serviceId:BridgeApplications1</
serviceId><SCPDURL>/d8a8568a
-53f7-f623-29e6-
147411119657/BridgeApplications/scpd.xml</
SCPDURL><controlURL
>/d8a8568a-53f7-f623-29e6-
147411119657/BridgeApplications/control.xml</
controlURL><event
SubURL>/d8a8568a-53f7-f623-29e6-
147411119657/BridgeApplications/eventSub.xml</event-
SubURL></
service></serviceList></device></root>

In the example messages and embodiments provided above, the device information includes the hash of the certificate of the sending device 110 as the serial number parameter. In the above example, the hash of the certificate of the sending device 110 has a value of 20202020202020202020202020202020202020. In an example embodiment, an additional parameter is provided identifying the algorithm used to generate the hash of the certificate of the sending device 110.

In some embodiments, communications may be sent by the sending device 110 to announce the presence of the device 110 in response to or after detecting that the device 110 has entered a new network 101 or has re-entered a network 101. In some embodiments, communications may be sent in response to a request for information. In one embodiment the sending device 110 identifies itself and advertises its presence by sending a transmission in accordance with a discovery protocol such as MNDS/DNS-SD.

In one embodiment, in response to a query for devices which support a specific service, the sending device 110 may send a response which includes a hash of the certificate. In one embodiment, the sending device 110 responds only to queries regarding services which are supported by the sending device 110. Rather than the sending device 110 responding to a query with information, such as IP address, serial number or other identifying information, which any other device may use to identify the sending device 110, a response is transmitted by the sending device 110 which includes a hash of the certificate of the sending device.

Example communications of an embodiment according to an MDNS/DNS-SD protocol are provided in the sample network captures below. An example network query sent by a device 110 such as a receiving device 110, for devices supporting the service "tunnel" is first illustrated.

| No. | Time | Source | Destination | Protocol | Length |
|---|---|---|---|---|---|
| 15 | 21.063795 | fe80::62eb:69ff:fea0:93c9 | ff02::fb | MDNS | 188 |
| Info | | | | | |
| Standard query PTR _tunnel._tcp.local, "QM" question | | | | | |

Frame 15: 188 bytes on wire (1504 bits), 188 bytes captured (1504 bits) Ethernet II, Src: QuantaCo_a0:93:c9 (60:eb:69:a0:93:c9),
Dst: IPv6mcast_00:00:00:fb (33:33:00:00:00:fb)
Internet Protocol Version 6, Src: fe80::62eb:69ff:fea0:93c9 (fe80::62eb:69ff:fea0:93c9), Dst: ff02::fb (ff02::fb)
User Datagram Protocol, Src Port: mdns (5353), Dst Port: mdns (5353) Domain Name System (query)

In response to this query, a reply is sent by the sending device 110. In one embodiment, in place of an IP address identifying a service name, a hash of a certificate of the sending device 110 may be transmitted. As illustrated below, in one embodiment, in place of a service name or IP address identifying the sending device 110, a communication is transmitted which includes a salt and a truncated salted hash of a certificate of the sending device 110.

| No. | Time | Source | Destination | Protocol | Length |
|---|---|---|---|---|---|
| 16 | 21.206401 | 192.168.0.113 | 224.0.0.251 | MDNS | 141 |
| Info | | | | | |
| Standard query ANY 0e1c72e42671d102578877cd90ba06._tunnel._tcp.local, "QU" question | | | | | |

Frame 16: 141 bytes on wire (1128 bits), 141 bytes captured (1128 bits) Ethernet II, Src: QuantaCo_a0:93:c9 (60:eb:69:a0:93:c9), Dst: IPv4mcast_00:00:fb (01:00:5e:00:00:fb)
Internet Protocol Version 4, Src: 192.168.0.113 (192.168.0.113), Dst: 224.0.0.251 (224.0.0.251)
User Datagram Protocol, Src Port: mdns (5353), Dst Port: mdns (5353)

In the sample message illustrated above the response includes the service name "0e1c72e42671d102578877cd90ba06". The first 40 bits of the service name represents the salt and the remaining bits represent a truncated salted hash of the certificate of the sending device 110. The hash or salted hash of the sending device 110 may be truncated due to size limitations in the service name parameter.

At the receiving device 110, the truncated salted hash is compared with salted hashes of the certificates stored in the certificate storage 192 of the receiving device 110. If a match is found between the received truncated salted hash and the first or a truncated portion of a salted hash of a certificate stored in the receiving device 110, the identity associated with the corresponding or matching hash is linked to the sending device 110.

Figure 4:
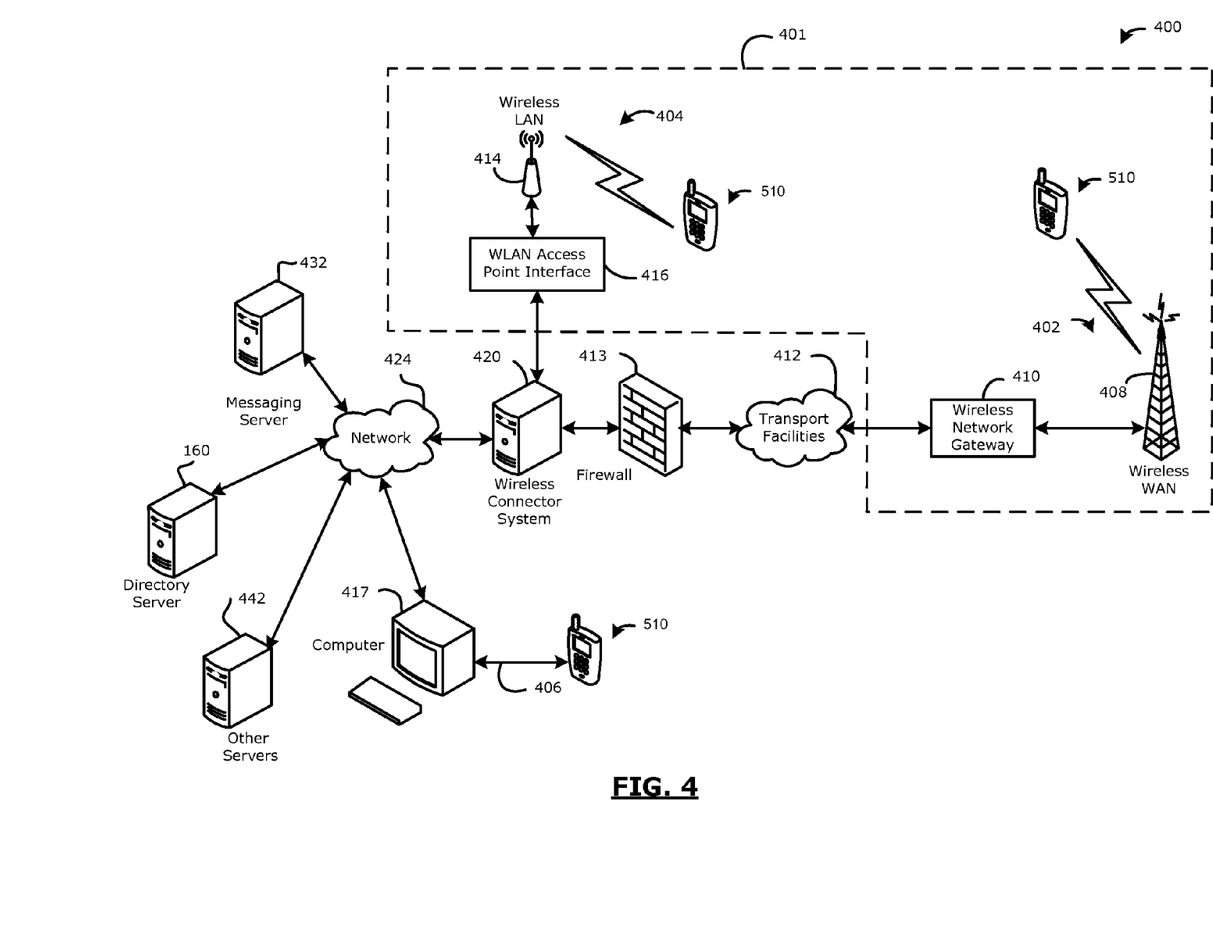
FIG. 4 is a block diagram illustrating a system in accordance with an implementation of the present disclosure.

FIG. 4 shows in block diagram form a communication system 400 and communication systems 401 in which example embodiments of the present disclosure can be applied. The communication system 400 comprises a number of electronic mobile devices 510 according to embodiments of the present disclosure which may be connected to the systems 400, 401 in any of several different ways. Accordingly, several instances of electronic devices 510 are depicted in FIG. 4 employing different example ways of connecting to systems 400, 401. Electronic devices 510 are connected to a communication network 401 which may comprise one or more of a Wireless Wide Area Network (WWAN) 402 and a Wireless Local Area Network (WLAN) 404 or other suitable wired or wireless network arrangements. In some embodiments, the electronic devices 510 are configured to communicate over both the WWAN 402 and WLAN 404, and to roam between these networks. In some embodiments, the communication network 401 may comprise multiple WWANs 402 and WLANs 404.

Figure 5:
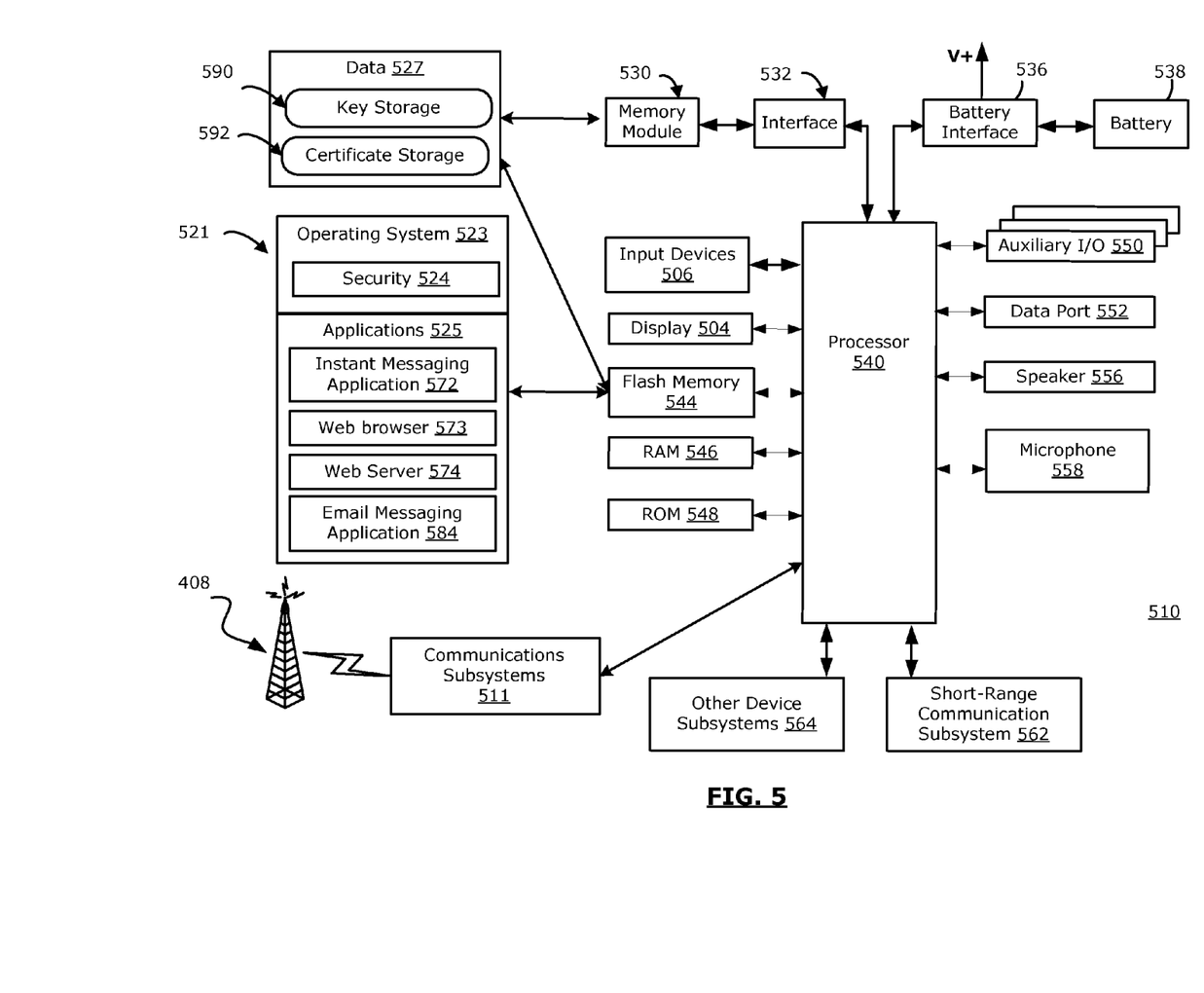
FIG. 5 is a block diagram of a mobile communications device in accordance with an implementation of the present disclosure.

The WWAN 402 may be implemented as any suitable wireless access network technology. By way of example, but not limitation, the WWAN 402 may be implemented as a wireless network that includes a number of transceiver base stations 408 (one of which is shown in FIG. 5) where each of the base stations 408 provides wireless Radio Frequency (RF) coverage to a corresponding area or cell. The WWAN 402 is typically operated by a mobile network service provider that provides subscription packages to users of the electronic devices 510. In some embodiments, the WWAN 402 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSDPA (High-Speed Downlink Packet Access), IEEE 802.16e (also referred to as Worldwide Interoperability for Microwave Access or "WiMAX), or various other networks. Although WWAN 402 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 402 may further comprise a wireless network gateway 410 which connects the electronic devices 510 to transport facilities 412, and through the transport facilities 412 to a wireless connector system 420. Transport facilities may include one or more private networks or lines, the public internet, a virtual private network, or any other suitable network. The wireless connector system 420 may be operated, for example, by an organization or enterprise such as a corporation, university, or governmental department, which allows access to a network 424 such as an internal or enterprise network and its resources, or the wireless connector system 420 may be operated by a mobile network provider. In some embodiments, the network 424 may be realised using the internet rather than an internal or enterprise network.

The wireless network gateway 410 provides an interface between the wireless connector system 420 and the WWAN 402, which facilitates communication between the electronic devices 510 and other devices (not shown) connected, directly or indirectly, to the WWAN 402. Accordingly, communications sent via the electronic devices 510 are transported via the WWAN 402 and the wireless network gateway 410 through transport facilities 412 to the wireless connector system 420. Communications sent from the wireless connector system 420 are received by the wireless network gateway 410 and transported via the WWAN 402 to the electronic devices 510.

The WLAN 404 comprises a wireless network which, in some embodiments, conforms to IEEE 802.11x standards (sometimes referred to as Wi-Fi) such as, for example, the IEEE 802.11a, 802.11b and/or 802.11g standard. Other communication protocols may be used for the WLAN 404 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 404 includes one or more wireless RF Access Points (AP) 414 (one of which is shown in FIG. 5) that collectively provide a WLAN coverage area.

The WLAN 404 may be a personal network of the user, an enterprise network, or a hotspot offered by an internet service provider (ISP), a mobile network provider, or a property owner in a public or semi-public area, for example. The access points 414 are connected to an access point (AP) interface 416 which may connect to the wireless connector system 420 directly (for example, if the access point 414 is part of an enterprise WLAN 404 in which the wireless connector system 420 resides), or indirectly via the transport facilities 412 if the access point 414 is a personal Wi-Fi network or Wi-Fi hotspot (in which case a mechanism for securely connecting to the wireless connector system 420, such as a virtual private network (VPN), may be required). The AP interface 416 provides translation and routing services between the access points 414 and the wireless connector system 420 to facilitate communication, directly or indirectly, with the wireless connector system 420.

The wireless connector system 420 may be implemented as one or more servers, and is typically located behind a firewall 413. The wireless connector system 420 manages communications, including email messages, to and from a set of managed electronic devices 510. The wireless connector system 420 also provides administrative control and management capabilities over users and electronic devices 510 which may connect to the wireless connector system 420.

The wireless connector system 420 allows the electronic devices 510 to access the network 424 and connected resources and services such as a messaging server 432 (for example, a Microsoft Exchange™, IBM Lotus Domino™, or Novell GroupWise™ email messaging server), a directory server 160 and optionally other servers 442. The other servers 442 may comprise a content server for providing content such as internet content or content from an organization's internal servers to the electronic devices 510 in the communication network 401, an application server for implementing server-based applications such as instant messaging (IM) applications, or a web server for providing content accessible by a web browser.

For the purposes of the described example embodiments, any server within an enterprise network, such as a messaging server or any other server, will be referred to as an enterprise server. A service may include one or more servers or enterprise servers.

The wireless connector system 420 typically provides a secure exchange of data (e.g., email messages, personal information manager (PIM) data, and IM data) with the electronic devices 510. In some embodiments, communications between the wireless connector system 420 and the electronic devices 510 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data.

Encryption keys used for communications or for encrypting data stored on the device can be protected via various means such as a password or hardware-based protections, such as those afforded by hardware-based key stored mechanisms.

The wireless network gateway 410 is adapted to send data packets received from the mobile communication device 510 over the WWAN 402 to the wireless connector system 420. The wireless connector system 420 then sends the data packets to the appropriate connection point such as the messaging server 432, or other servers 442. Conversely, the wireless connector system 420 sends data packets received, for example, from the messaging server 432, or other servers 442 to the wireless network gateway 410 which then transmit the data packets to the destination mobile electronic device 510. The AP interfaces 416 of the WLAN 404 provide similar sending functions between the mobile communication device 510, the wireless connector system 420 and network connection point such as the messaging server 132, or other servers 442.

The network 424 may comprise a private local area network, metropolitan area network, wide area network, the public internet or combinations thereof and may include virtual networks constructed using any of these, alone, or in combination.

A mobile communication device 510 may alternatively connect to the wireless connector system 420 using a computer 417, such as desktop or notebook computer, via the network 424. A link 406 may be provided for exchanging information between the mobile communication device 510 and computer 417 connected to the wireless connector system 420. The link 406 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile communication device 510 and computer 417. The short-range wireless communication interface may be a personal area network (PAN) interface. A personal area network is a wireless point-to-point connection meaning no physical cables are required to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the Bluetooth™ special interest group, or IEEE 802.15.3a, also referred to as Ultra-Wideband (UWB), or other PAN connection.

The communications networks 400, 401 and mobile devices 510 support a discovery protocol to enable the mobile 510 to send communications to advertise the presence of the electronic device 510 in the communications network 400, 401 and to receive communications regarding the presence of other mobile devices 510 in the network 400, 401. Such communications also may include an address, such as a HTTP URL for a location storing an XML description of the mobile communication device 510. Communications also may be sent in response to requests for information and to notify other devices of the withdrawal of the electronic device 510 from the network 400, 401. The discovery protocol may comprise a simple service discovery protocol (SSDP), a universal plug and play (UPNP) system, a proprietary discovery protocol or other similar protocols.

It will be appreciated that the above-described communication system is provided for the purpose of illustration only, and that the above-described communication system comprises one possible communication network configuration of a multitude of possible configurations for use with the mobile devices 510. The teachings of the present disclosure may be employed in connection with any other type of network and associated devices that are effective in implementing or facilitating communication including communication over networks which are wired, wireless or a combination of wired and wireless. Suitable variations of the communication system will be understood to a person of skill in the art and are intended to fall within the scope of the present disclosure.

FIG. 5 illustrates one embodiment of a mobile communications device 510 in which example embodiments described in the present disclosure can be applied. The mobile communications device 510 shown in FIG. 5 is an exemplary embodiment of the mobile communications device 510 described with reference to FIG. 1.

The mobile communication device 510 is a two-way communication device having at least data and possibly also voice communication capabilities, and the capability to communicate with other computer systems, for example, via the Internet. Depending on the functionality provided by the mobile communication device 510, in various embodiments the device may be a data communication device, a multiple-mode communication device configured for both data and voice communication, a smartphone, a mobile telephone or a PDA (personal digital assistant) enabled for wireless communication, or a computer system with a wireless modem.

The mobile communication device 510 includes a case (not shown) housing the components of the device 510. The internal components of the device 510 are constructed on a printed circuit board (PCB). The mobile communication device 510 includes a controller comprising at least one processor 540 such as a microprocessor which controls the overall operation of the mobile communication device 510. The processor 540 interacts with device subsystems such as a communication subsystem 511 for exchanging radio frequency signals with a network, such as the communication network 401, to perform communication functions. The processor 540 interacts with additional device subsystems including a display screen 504, such as a liquid crystal display (LCD) screen, input devices 506 such as a keyboard and control buttons, flash memory 544, random access memory (RAM) 546, read only memory (ROM) 548, auxiliary input/output (I/O) subsystems 550, data port 552 such as serial data port, such as a Universal Serial Bus (USB) data port, speaker 556, microphone 558, short-range communication subsystem 562, and other device subsystems generally designated as 564. Some of the subsystems shown in FIG. 5 perform communication-related functions, whereas other subsystems may provide "resident" or on-device functions.

The device 510 may comprise a touchscreen display in some embodiments. The touchscreen display may be constructed using a touch-sensitive input surface connected to an electronic controller and which overlays the display screen 504. The touch-sensitive overlay and the electronic controller provide a touch-sensitive input device and the processor 540 interacts with the touch-sensitive overlay via the electronic controller.

The mobile communication device 510 may communicate with any one of a plurality of fixed transceiver base stations 408 of the cellular communications network 408 within its geographic coverage area. The mobile communication device 510 may send and receive communication signals over the communication network 408 after the required network registration or activation procedures have been completed.

The processor 540 operates under stored program control and executes software modules 521 stored in memory such as persistent memory, for example, in the flash memory 544. The software modules 521 comprise operating system software 523 and software applications 525, which for example, may include a text or instant messaging application 572, a web browser 573, a web server 574, an email messaging application 584 and a security module 524. In some example embodiments, the functions performed by each of the applications 524, 572, 573, 574 and 584 may each be realized as a plurality of independent elements, and any one or more of these elements may be implemented as parts of other software applications 525. In some example embodiments, one or more applications 525 are configured to receive data, such as files, documents or other information, from a server, such as a messaging server 432 (FIG. 4), or a web or other server 442 (FIG. 4). Non-limiting examples of data received from a server may include email attachments, files transferred via file transfer protocol (FTP) or any other protocol, documents or files downloaded from a web page via a web browser, or files sent via a text or instant messaging application. In some embodiments, received data includes certificates and associated identities of other electronic devices 501 received from a directory server 160. The software applications 525 may among other things, each be implemented through stand-alone software applications, or combined together in one or more of the operating system 523 or one or more of the other software applications 525. In some embodiments, the functions performed by each of the above identified modules may be realized as a plurality of independent elements, rather than a single integrated element, and any one or more of these elements may be implemented as parts of other software applications.

In some example embodiments, the mobile communication device 510 may be configured or operate as a web client via the web browser 573 and/or as a server via the web server 574. The mobile communication device 510 may be configured to implement encryption or verification using the associated keys. For example, the mobile communication device 510 may store within a key storage 590 one or more public keys, one or more private keys, or a combination of public keys and private keys. The key storage 590 may include any portion of memory 544 on the device 510. In some embodiments, the memory 544 may include a secure area in which sensitive data, such as key material, is stored. In some embodiments, the secure area may itself be secured using cryptography to prevent unauthorized access. The electronic device 510 may store within a certificate storage area 592 in the memory 544 a certificate of the device 510 as well as one or more certificates of other devices 510 in the network 408. Each of the certificates may be stored in association with an identity which represents an electronic device 510.

In some examples, the software applications 525 may be implemented using a number of services which define the communication protocols used to communicate between a server and an application on the communication device. Some applications may only connect to a single type of server using the same communication protocol settings and will therefore only operate using a single service, while other applications may connect to a variety of servers using different communication protocols and will require multiple services. For example, a banking application on a communication device may only require a single service defining the communication protocol for securely communicating with the bank's online banking server, while a web browser may require many different services such as services for general web page browsing, for secure web page browsing, for streaming video, for accessing corporate web email, or for accessing online public email services.

For illustration purposes, FIG. 5 shows a security module 524 as a component of the operating system 523. In some example embodiments, the security module 524 may perform security functions including the generation and management of private keys and/or public. The security module 524 may be used to perform the encryption/decryption or the signing/verification of data using such keys, as described in detail herein. The security module 524 may be used to create a certificate for the device 510.

The software modules 521 or parts thereof may be temporarily loaded into volatile memory such as the RAM 546. The RAM 546 is used for storing runtime data variables and other types of data or information, as will be apparent to those skilled in the art. Although specific functions are described for various types of memory, this is merely an example, and a different assignment of functions to types of memory could also be used.

In some embodiments, the auxiliary input/output (I/O) subsystems 550 may comprise an external communication link or interface, for example, an Ethernet connection. The mobile communication device 510 may comprise other wireless communication interfaces for communicating with other types of wireless networks, for example, a wireless network such as an orthogonal frequency division multiplexed (OFDM) network or a GPS transceiver for communicating with a GPS satellite network (not shown). The auxiliary I/O subsystems 550 may comprise a pointing or navigational tool (input device) such as a clickable trackball or scroll wheel or thumbwheel, a vibrator for providing vibratory notifications in response to various events on the mobile communication device 510 such as receipt of an electronic communication or incoming phone call, or for other purposes such as haptic feedback (touch feedback).

In some embodiments, the mobile communication device 510 also includes a removable memory card 530 (typically comprising flash memory) and a memory card interface 532. The mobile communication device 510 can store data 527 on the removable memory card 530, in an erasable persistent memory, which in one example embodiment is the flash memory 544, or on both a removable memory card and in an erasable persistent memory. Network access typically associated with a subscriber or user of the mobile communication device 510 via the memory card 530, which may be a Subscriber Identity Module (SIM) card for use in a GSM network or other type of memory card for use in the relevant wireless network type. The memory card 530 is inserted in or connected to the memory card interface 532 of the mobile communication device 510 in order to operate in conjunction with the communication network 400, 401.

In various embodiments, the data 542 includes service data comprising information required by the mobile communication device 510 to establish and maintain communication with the communication network 400, 401. The data 527 may also include user application data such as email messages, address book and contact information, calendar and schedule information, word processor documents, spreadsheets, presentation slides, image files, audio and video files and other commonly stored user information stored on the mobile communication device 510 by its user, and other data. The data 527 may include certificates and associated identities of other electronic devices 501. The data 527 stored in the persistent memory (e.g. flash memory 544) of the mobile communication device 510 may be organized, at least partially, into a number of databases each containing data items of the same data type or associated with the same application. For example, email messages, contact records, and task items may be stored in individual databases within the device memory.

In some embodiments, the mobile communication device 510 is provided with a service routing application programming interface (API) which provides an application with the ability to route traffic through a serial data (i.e., USB) or Bluetooth® (Bluetooth® is a registered trademark of Bluetooth SIG, Inc.) connection to the host computer system using standard connectivity protocols. When a user connects their mobile communication device 510 to the host computer system via a USB cable or Bluetooth® connection, traffic that was destined for the communication network 401 is automatically routed to the mobile communication device 510 using the USB cable or Bluetooth® connection. Similarly, any traffic destined for the communication network 401 is automatically sent over the USB cable Bluetooth® connection to the host computer system for processing.

The serial data port 552 may be used for synchronization with a user's host computer system (not shown). The serial data port 552 enables a user to set preferences through an external device or software application and extends the capabilities of the mobile communication device 510 by providing for information or software downloads to the mobile communication device 510 other than through the communication network 401. The alternate download path may, for example, be used to load an encryption key onto the mobile communication device 510 through a direct, reliable and trusted connection to thereby provide secure device communication. The alternate download path may be used to store certificates and associated identities in the mobile communications device 510. In some embodiments, data received from a server include certificates and associated identities of other electronic devices 501.

The mobile communication device 510 also includes a battery 538 as a power source, which is typically one or more rechargeable batteries that may be charged, for example, through charging circuitry coupled to a battery interface such as the serial data port 552. The battery 538 provides electrical power to at least some of the electrical circuitry in the mobile communication device 510, and the battery interface 536 provides a mechanical and electrical connection for the battery 538. The battery interface 536 is coupled to a regulator (not shown) which provides power V+ to the circuitry of the mobile communication device 510.

The short-range communication subsystem 562 is an additional optional component which provides for communication between the mobile communication device 510 and different systems or devices, which need not necessarily be similar devices. For example, the subsystem 562 may include an infrared device and associated circuits and components, or a wireless bus protocol compliant communication mechanism such as a Bluetooth® communication module to provide for communication with similarly-enabled systems and devices.

A predetermined set of applications that control basic device operations, including data and possibly voice communication applications will normally be installed on the mobile communication device 510 during or after manufacture. Additional applications and/or upgrades to the operating system 523 or software applications 525 may also be loaded onto the mobile communication device 510 through the communication network 401, the auxiliary I/O subsystem 550, the serial port 552, the short-range communication subsystem 562, or other suitable subsystems 564 or other wireless communication interfaces. The downloaded programs or code modules may be permanently installed, for example, written into the program memory (i.e. the flash memory 544), or written into and executed from the RAM 546 for execution by the processor 540 at runtime. Such flexibility in application installation increases the functionality of the mobile communication device 510 and may provide enhanced on-device functions, communication-related functions, or both. For example, secure communication applications may enable electronic commerce functions and other such financial transactions to be performed using the mobile communication device 510.

The mobile communication device 510 may provide two principal modes of communication: a data communication mode and an optional voice communication mode. In the data communication mode, a received data signal such as a text message, an email message, or web page download will be processed by the communication subsystem 511 and input to the processor 540 for further processing. For example, a downloaded web page may be further processed by a web browser module to parse the HTML structure and format of the web page and output the web page to the display 504. A user of the mobile device 110 may also compose data items, such as email messages, for example, using the input devices in conjunction with the display screen 204. These composed items may be transmitted through the communication subsystem 511 over the communication network 401.

In the voice communication mode, the mobile communication device 510 provides telephony functions and operates as a typical cellular phone. The overall operation is similar, except that the received signals would be output to the speaker 556 and signals for transmission would be generated by a transducer such as the microphone 558. The telephony functions are provided by a combination of software/firmware (i.e., the voice communication module) and hardware (i.e., the microphone 558, the speaker 556 and input devices). Alternative voice or audio I/O subsystems, such as a voice message recording subsystem, may also be implemented on the mobile communication device 510. Although voice or audio signal output is typically accomplished primarily through the speaker 556, the display screen 504 may also be used to provide an indication of the identity of a calling party, duration of a voice call, or other voice call related information.

While the present disclosure is primarily described in terms of methods, a person of ordinary skill in the art will understand that the present disclosure is also directed to various apparatus such as a handheld electronic device including components for performing at least some of the aspects and features of the described methods, be it by way of hardware circuits, software or any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The term "computer readable medium" as used herein means any medium which can store instructions for use by or execution by a computer or other computing device including, but not limited to, a portable computer diskette, a hard disk drive (HDD), a random access memory (RAM), a read-only memory (ROM), an erasable programmable-read-only memory (EPROM) or flash memory, an optical disc such as a Compact Disc (CD), Digital Versatile Disc (DVD) or Blu-Ray™ Disc, and a solid state storage device (e.g., NAND flash or synchronous dynamic RAM (SDRAM)).

Variations may be made to some example embodiments, which may include combinations and sub-combinations of any of the above. The various embodiments presented above are merely examples and are in no way meant to limit the scope of this disclosure. Variations of the innovations described herein will be apparent to persons of ordinary skill in the art having the benefit of the present disclosure, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein intends to cover and embrace all suitable changes in technology.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two, or in any other manner. Moreover, the present disclosure is also directed to a pre-recorded storage device or other similar computer readable medium including program instructions stored thereon for performing the methods described herein.

The various embodiments presented above are merely examples and are in no way meant to limit the scope of this disclosure. Variations of the innovations described herein will be apparent to persons of ordinary skill in the art, such variations being within the intended scope of the present disclosure. In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present disclosure as a whole. The subject matter described herein and in the recited claims intends to cover and embrace all suitable changes in technology.

The invention claimed is:

1. A method of secure notification of presence of an electronic device in a communications network, wherein a certificate is associated with an identity, the method comprising:
   generating a salted hash of the certificate and a salt;
   transmitting a multicast message containing an address location identifying where to retrieve the salted hash;
   receiving a request message responsive to the multicast message; and
   sending a reply message responsive to the request message, wherein the reply message includes the salt and a truncated salted hash of the certificate, the reply message excluding the identity.

2. A method according to claim 1 wherein the certificate includes the identity.

3. A method according to claim 1 further comprising securely transmitting the certificate and the identity to a second electronic device through a secure communications channel.

4. A method according to claim 3 wherein the second electronic device comprises a server.

5. A method according to claim 1 wherein the identity represents one of the identity of the electronic device or the identity of a user associated with the electronic device.

6. A method according to claim 1 wherein the certificate comprises a self-signed certificate.

7. A method according to claim 1 further comprising establishing a secure connection in the communications network using the certificate.

8. An electronic device, comprising:
   a communication subsystem for sending and receiving messages over a communications network;
   a memory storing a certificate associated with an identity; and
   a processor configured to: generate a salted hash of the certificate and a salt; transmit a multicast message containing an address location identifying where to retrieve the salted hash; receive a request message responsive to the multicast message; and send a reply message responsive to the request message, wherein the reply message includes the salt and a truncated salted hash of the certificate, the reply message excluding the identity.

9. A method of secure identification of a sending electronic device using a receiving electronic device, the method comprising:
   storing one or more certificates in a memory of a receiving electronic device, each of the certificates is associated with an identity;
   receiving a multicast message containing an address location identifying where to retrieve a salted hash of a certificate of the sending device;
   transmitting a request message responsive to the multicast message;
   receiving a reply message responsive to the request message, wherein the reply message includes a salt and a received truncated salted hash of the certificate of the sending device, the reply message excluding the identity;

comparing the received truncated salted hash with truncated salted hashes of the one or more stored certificates; and on a condition that the received truncated salted hash corresponds to one of the truncated salted hashes of the stored certificates;

identifying the identity of the sending device as the identity associated with the received truncated salted hash.

10. A method according to claim 9, further comprising securely receiving the one or more certificates and each associated identity from a server through a secure communications channel.

11. A method according to claim 9, further comprising initiating secure communications with the sending device.

12. A method according to claim 9 wherein the identity comprises a user identity, a device identity, or both a user identity and a device identity.

13. A method according to claim 9 wherein the identity represents a group of peer devices.

14. An electronic device, comprising:
a communication subsystem for sending and receiving messages over a network;
a memory storing a plurality of certificates, each certificate associated with an identity; and
a processor configured to: receive a multicast message containing an address location identifying where to retrieve a salted hash of a certificate of the sending device; transmit a request message responsive to the multicast message; receive a reply message responsive to the request message, wherein the reply message includes a salt and a received truncated salted hash of the certificate of the sending device, the reply message excluding the identity; compare the received truncated salted hash with truncated salted hashes of the plurality of stored certificates; and on a condition that the received truncated salted hash corresponds to one of the truncated salted hashes of the stored certificates, identify the identity of the sending device as the identity associated with the received truncated salted hash.

15. A system for secure communications, the system comprising:
a communications network;
at least one sending electronic device configured to: store a certificate associated with an identity; generate a salted hash of the certificate and a salt; transmit a multicast message containing an address location identifying where to retrieve the salted hash; receive a request message responsive to the multicast message; and send a reply message responsive to the request message, wherein the reply message includes the salt and a truncated salted hash of the certificate, the reply message excluding the identity;
at least one receiving electronic device configured to: store a plurality of certificates associated with one or more identities in a memory of the receiving device, receive the multicast message containing an address location identifying where to retrieve a salted hash of a certificate of the sending device; transmit the request message responsive to the multicast message; receive the reply message responsive to the request message, wherein the reply message includes a salt and a received truncated salted hash of the certificate of the sending device, the reply message excluding the identity; compare the received truncated salted hash with truncated salted hashes of the plurality of stored certificates, and on a condition that the received truncated salted hash corresponds to one of the truncated salted hashes of the stored certificates, identify the identity of the sending device as the identity associated with the received truncated salted hash.

16. A system according to claim 15, further comprising a server configured to store a plurality of certificates and associated identities and to communicate with the at least one sending device and the at least one receiving electronic device.

* * * * *